US012736206B2

(12) United States Patent
Jiang

(10) Patent No.: US 12,736,206 B2
(45) Date of Patent: Sep. 15, 2026

(54) SELF-CALIBRATION METHOD FOR POSITIONING OF LIGHT FIXTURE AND LIGHT FIXTURE

(71) Applicant: Guangzhou Haoyang Electronic Co., Ltd., Guangzhou (CN)

(72) Inventor: Weikai Jiang, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 612 days.

(21) Appl. No.: 18/128,759

(22) Filed: Mar. 30, 2023

(65) Prior Publication Data

US 2024/0210019 A1 Jun. 27, 2024

(30) Foreign Application Priority Data

Dec. 21, 2022 (CN) ......................... 202211650247.9

(51) Int. Cl.

| | |
|---|---|
| ***F21V 21/15*** | (2006.01) |
| ***F21V 14/02*** | (2006.01) |
| ***G01D 5/245*** | (2006.01) |
| ***G01D 5/249*** | (2006.01) |
| ***G01D 18/00*** | (2006.01) |
| *F21W 131/406* | (2006.01) |

(52) U.S. Cl.

CPC .............. *F21V 21/15* (2013.01); *F21V 14/02* (2013.01); *G01D 5/2454* (2013.01); *G01D 5/2497* (2013.01); *G01D 18/004* (2013.01); *G01D 18/006* (2013.01); *F21W 2131/406* (2013.01)

(58) Field of Classification Search

CPC .......... F21V 21/15; F21V 21/14; F21V 21/00; F21V 14/02; F21V 14/00; F21V 21/26; G01D 5/2454; G01D 5/245; G01D 5/244; G01D 5/12; G01D 5/00; G01D 5/2497; G01D 18/004; G01D 18/002; G01D 18/00; G01D 18/006; G01D 18/008; G01D 3/022; F21W 2131/406; Y02B 20/40; H05B 47/10; H05B 47/00

See application file for complete search history.

(56) References Cited

U.S. PATENT DOCUMENTS

| | | | | |
|---|---|---|---|---|
| 5,608,394 A * | 3/1997 | Hirabayashi | ......... | G01D 5/2457 341/11 |
| 2003/0000965 A1* | 1/2003 | Bach | ....................... | F04B 13/00 222/135 |

(Continued)

*Primary Examiner* — Mohamed Charioui

(74) *Attorney, Agent, or Firm* — MUNCY, GEISSLER, OLDS & LOWE, P.C.

(57) ABSTRACT

A self-calibration method for positioning of a light fixture includes steps of: S1. setting a plurality of preset positioning reference points around the circumference of the absolute encoder; driving the light fixture to rotate by the driving device and acquiring a corresponding first output value of the absolute encoder at each preset positioning reference point; S2. driving the light fixture to rotate by the driving device and acquiring a second output value of the absolute encoder, and when the second output value is equal to the corresponding first output value at a certain preset positioning reference point, taking the preset positioning reference point as a calibrated positioning reference point; and S3. positioning the light fixture according to the calibrated positioning reference point.

18 Claims, 3 Drawing Sheets

(56) References Cited

U.S. PATENT DOCUMENTS

| | | | | |
|---|---|---|---|---|
| 2009/0231852 | A1* | 9/2009 | Vinter | F21V 21/15 362/276 |
| 2013/0201316 | A1* | 8/2013 | Binder | G07C 3/02 701/2 |
| 2016/0102850 | A1* | 4/2016 | Rasmussen | F21V 23/0492 362/233 |
| 2019/0113339 | A1* | 4/2019 | Nolan | G01C 11/30 |

* cited by examiner

SELF-CALIBRATION METHOD FOR POSITIONING OF LIGHT FIXTURE AND LIGHT FIXTURE

CROSS REFERENCE TO RELATED APPLICATIONS

The present application claims priorities from Chinese Application No. CN 202211650247.9 filed on Dec. 21, 2022, all of which are hereby incorporated herein by reference.

TECHNICAL FIELD

The present invention relates to the technical field of light fixtures, and more particularly, relates to a self-calibration method for positioning of a light fixture and a light fixture.

BACKGROUND

An absolute encoder can directly read the absolute angle encoding position, which now has been applied in the positioning system of a light head of certain light fixtures, such as stage light fixture, due to its features of output of absolute angle, and less reset time and great convenience as it is not required to find a starting reference point in resetting process once the light fixture is powered on. However, the absolute encoder suffers from non-linear positional distortion as shown in FIG. 1. The degree of data distortion is related to the relative mounting position of a magnet and an induction chip, including factors such as the coaxiality and distance between the magnet and the inductor, and the magnetic field strength of the magnet. Such distorted data from the absolute encoder will cause a deviation in the positioning accuracy of the light head of the stage light fixture. Moreover, such deviation is far greater than a deviation caused by conventional photoelectric encoder. Therefore, there is a need to calibrate the distortion of the absolute encoder.

In the prior art, in the calibration of reset process, in order to find an initial position, it is required to rotate in a certain direction to a limit position to be stopped by colliding, such way takes a long time and causes large noise due to colliding, which consequently affects the experience of use.

SUMMARY

Therefore, the present invention provides a self-calibration method for positioning of a light fixture, which is free from the above-mentioned deficiencies. According to such method, in the reset process, the light fixture is not required to rotate in a certain direction to a limit position to be stopped by colliding to find an initial position as in the prior art, which thus takes short time for positioning and avoids large noise due to colliding, thereby improving the experience of use.

According to the present invention, an absolute encoder for indicating a rotation angle of the light fixture and a driving device for driving the light fixture to rotate are included.

In step S1, a plurality of preset positioning reference points are set around a circumference of the absolute encoder. The light fixture is driven by the driving device to rotate to acquire a corresponding first output value of the absolute encoder at each preset positioning reference point.

In step S2, before positioning the light fixture is driven to rotate by the driving device to acquire a second output value of the absolute encoder, and when the second output value is equal to the corresponding first output value at a certain preset positioning reference point, taking such preset positioning reference point as a calibrated positioning reference point.

In step S3, the light fixture is conducted positioning according to the calibrated positioning reference point.

In such method, by setting the plurality of preset positioning reference points, when powered on and the light fixture is placed at a reset state, the driving device drives the light fixture to rotate to search for the preset positioning reference point. When the second output value is equal to the corresponding first output value at the preset positioning reference point, the preset positioning reference point is taken as the calibrated positioning reference point. The light fixture is positioned taking the calibrated positioning reference point as a starting point. The method according to the present thus takes shorter time with no noise, and has a good experience of use during positioning of the light fixture, as it is not required to rotate to the limit position and to be stopped by colliding.

In order to help quickly find the calibrated positioning reference point during positioning, thus further shortening the time for positioning, the plurality of preset positioning reference points are preferably uniformly set around the circumference of the absolute encoder.

Particularly; thirty to forty preset positioning reference points are uniformly set around the circumference of the absolute encoder. An appropriate number of preset positioning reference points can be better to increase the speed of finding the calibrated positioning reference point, thereby further improving the positioning speed of the light fixture.

Specifically, the plurality of preset positioning reference points may be uniformly set around the circumference of the absolute encoder at intervals of a degree between 5° and 15°, which is preferably divisible by 360°, with the intersection of the vertical upward radial direction with the circumference as a starting point of 0°, the counterclockwise direction of rotation being negative degrees and the clockwise direction of rotation being positive degrees.

As the stepping motor can precisely control the rotation angle and speed of the light fixture, the driving device may include a stepping motor for driving the light fixture to rotate according to the present invention.

The driving device further includes a driving gear and a driven gear. The absolute encoder is provided on the driven gear, and the driven gear is connected with the light fixture. The stepping motor is used for driving the driving gear to rotate, and the driving gear in turn drives the driven gear to rotate. Such a configuration can facilitate improving stability and accuracy of the rotation angle when the light fixture is rotated.

In a bid to facilitate further improving stability when the light fixture is rotated, the driving device may further include a belt. The driving gear and the driven gear are thus in transmission connection through the belt.

To correct the possible out-of-step of the stepping motor, a photoelectric encoder connected to the stepping motor is further included, which is used for detecting whether the stepping motor is overloaded to be out-of-step. The stepping motor according to the present invention can be completely open-loop controlled and has the characteristic of very high positioning precision. Therefore, in normal use, it does not need to rely on the photoelectric encoder. In the case where the stepping motor is not out-of-step, the stepping motor can perform accurate positioning directly on its own. However, if in the positioning process, the photoelectric encoder detects that the stepping motor is out-of-step, the out-of-step of the stepping motor can be corrected depending on the photoelectric encoder and the stepping motor is positioned to a correct position.

Due to low price and high precision of the absolute magnetic encoder, which determines the rotation angle according to the magnetic field direction, the absolute encoder in the present invention may be in form of an absolute magnetic encoder. Alternatively, the absolute encoder can also be designed as an absolute inductive encoder, which determines the rotation angle according to the change of magnetic field produced by electromagnetic induction, having better stability:

A controller is further included, which is connected to the driving device and the absolute encoder. The controller is configured to control the rotation of the light fixture via the driving device, and acquire an output value of the absolute encoder and compare the second output value with the corresponding first output value at the preset positioning reference point.

The present invention further provided a light fixture, which applies the self-calibration method for positioning described above. The light fixture includes a light head, a support arm for supporting the light head to rotate in a first dimension, and a case for supporting the support arm to rotate in a second dimension. A light source is arranged in the light head. At least one driving device is configured to drive the light head and/or the support arm to rotate. The absolute encoder is specifically configured to detect a rotation angle of the light head and/or the support arm.

Specifically; when the driving device is used for driving the light head to rotate, the driving device is connected to the light head, and in this case, the absolute encoder is used for indicating the rotation angle of the light head. When the driving device is used for driving the support arm to rotate, the driving device is connected to the support arm, and in this case, the absolute encoder is used for indicating the rotation angle of the support arm.

Compared with the prior art, the present embodiment sets the plurality of preset positioning reference points, when powered on and the light fixture is at a reset state, the driving device drives the light fixture to rotate to search for the preset positioning reference point. When the second output value is equal to the corresponding first output value at the preset positioning reference point, the preset positioning reference point is taken as the calibrated positioning reference point. The light fixture is positioned taking the calibrated positioning reference point a starting point. Such method thus takes shorter time with no noise, and has a good experience of use during positioning of the light fixture, as it is not required to rotate to the limit position and to be stopped by colliding.

DETAILED DESCRIPTION

Figure 1:
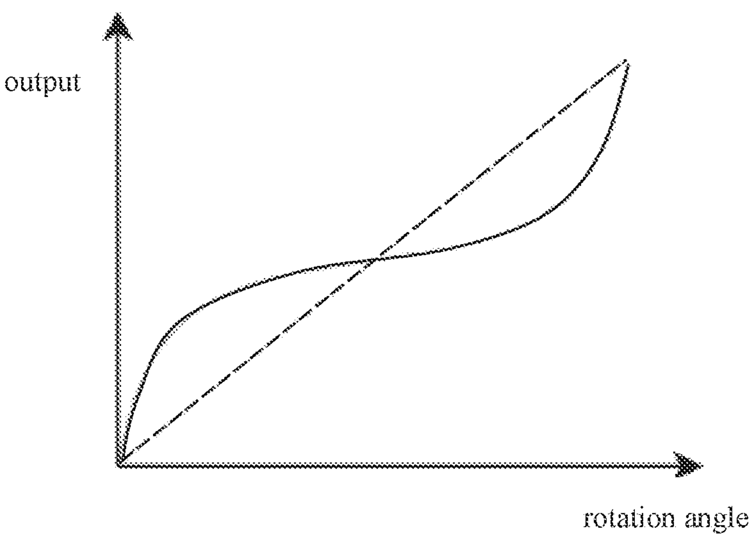
FIG. 1 is a diagram of data distortion of an absolute encoder according to a prior art, in which the dotted line shows the relationship between the angle read by the absolute encoder given by a supplier and an output value, and the solid line shows the relationship between the actual angle read by the absolute encoder and the output value.

The accompanying drawings are for exemplary illustration only, and should not be construed as limitations on this patent; in order to better illustrate this embodiment, some parts in the accompanying drawings may be omitted, enlarged or reduced, and they do not represent the size of the actual product: for those skilled in the art, it is understandable that certain well-known structures and descriptions thereof in the drawings may be omitted. The positional relationship described in the drawings is only for exemplary illustration, and should not be construed as limitations on this patent.

Figure 2:
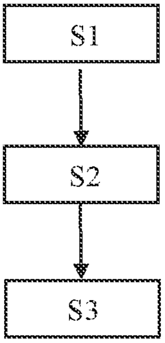
FIG. 2 is a schematic flowchart of a self-calibration method for positioning of a light fixture according to the present invention.
Figure 3:
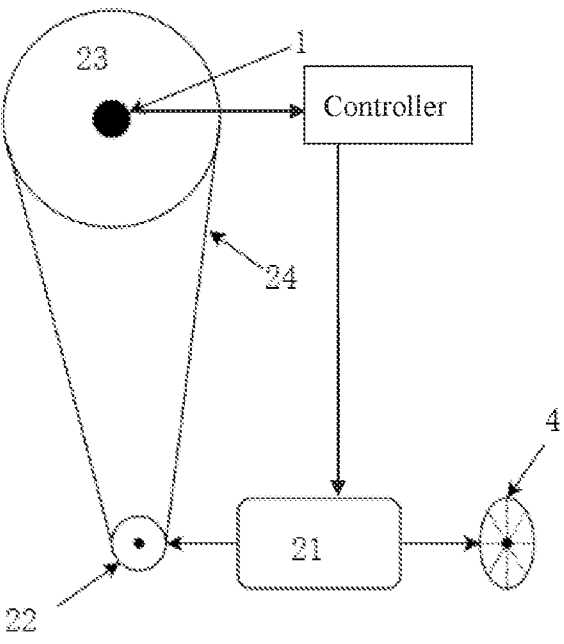
FIG. 3 is a schematic diagram showing a driving device connected to an absolute encoder according to the present invention.

FIG. 2 shows a self-calibration method for positioning of a light fixture. Referring to FIG. 3, an absolute encoder 1 for indicating the rotation angle of the light fixture and a driving device for driving the light fixture to rotate are included.

Figure 4:
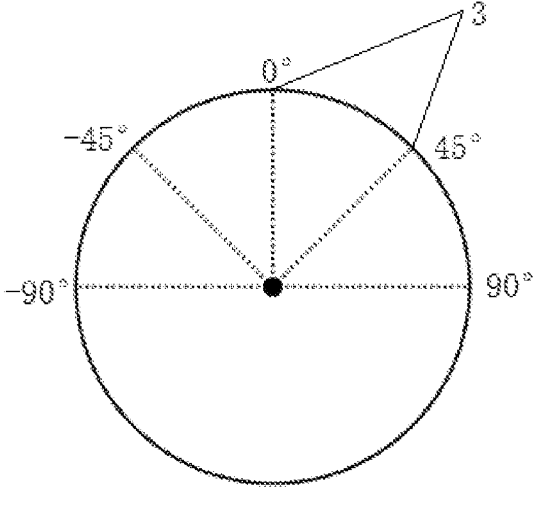
FIG. 4 is a schematic diagram showing how to set preset positioning reference points.

In step S1, as shown in FIG. 4 a plurality of preset positioning reference points 3 are set around the circumference of the absolute encoder. The light fixture is driven by the driving device to rotate to acquire a corresponding first output value of the absolute encoder 1 at each preset positioning reference points 3. This step is especially finished before leaving the factory.

In step S2, before positioning, the light fixture is driven to rotate by the driving device to acquire a second output value of the absolute encoder 1, and when the second output value is equal to the corresponding first output value at a certain preset positioning reference point 3, taking such preset positioning reference point 3 as a calibrated positioning reference point. This step is performed after leaving the factory.

In step S3, the light fixture is conducted positioning according to the calibrated positioning reference point.

According to the present embodiment, by setting the plurality of preset positioning reference points 3, when powered on and the light fixture is at a reset state, the driving device drives the light fixture to rotate to search for the preset positioning reference point 3. When the second output value is equal to the corresponding first output value at the preset positioning reference point 3, the preset positioning reference point 3 is taken as the calibrated positioning reference point. The light fixture is positioned taking the calibrated positioning reference point a starting point. Such method takes shorter time with no noise, and has a good experience of use during positioning of the light fixture, as it is not required to rotate to the limit position and to be stopped by colliding.

A controller may be further included, which is connected to the driving device and the absolute encoder 1. The controller controls the rotation of the light fixture by the driving device, and acquires an output value of the absolute encoder 1 and compares the second output value with the corresponding first output value at the preset positioning reference point.

The plurality of preset positioning reference points 3 are preferably uniformly set around the circumference of the absolute encoder 1. Such configuration will help to quickly find the calibrated positioning reference point during positioning, thus further shortening the time for positioning.

Especially, thirty to forty preset positioning reference points 3 are uniformly set around the circumference of the absolute encoder 1. An appropriate number of preset positioning reference points 3 can be better to increase the speed of finding the calibrated positioning reference point, thereby further improving the positioning speed of the light fixture.

Specifically, the plurality of preset positioning reference points 3 may be uniformly set around the circumference of the absolute encoder 1 at intervals of a degree between 5° and 15°, which is preferably divisible by 360°, with the intersection of the vertical upward radial direction with the circumference as a starting point of 0°, the counterclockwise direction of rotation being negative degrees and the clockwise direction of rotation being positive degrees. More specifically, thirty-six preset positioning reference points may be uniformly set at intervals of 10 degrees.

The driving device may include a stepping motor 21 for driving the light fixture to rotate. As well known, the stepping motor 21 can precisely control the rotation angle and speed of the light fixture.

According to the present embodiment, the driving device further includes a driving gear 22 and a driven gear 23. The absolute encoder 1 is provided on the driven gear 23, and the driven gear 23 is connected with the light fixture. The stepping motor 21 is used for driving the driving gear 22 to rotate, and the driving gear 22 is used for driving the driven gear 23 to rotate, so that the driven gear 23 in turn drives the light fixture to rotate. Such configuration can facilitate improving stability and accuracy of the rotation angle when the light fixture is rotated.

In this embodiment, the driving device may further include a belt 24. That is, the driving gear 22 and the driven gear 23 are in transmission connection through the belt 24. Such configuration can further facilitate improving stability when the light fixture is rotated.

According to this embodiment, a photoelectric encoder 4 connected to the stepping motor 21 is further included, which is used for detecting whether the stepping motor 21 is overloaded to be out-of-step. The stepping motor 21 can be completely open-loop controlled and has the characteristic of very high positioning precision. Therefore, in normal use, it does not need to rely on the photoelectric encoder 4. In the case where the stepping motor is not out-of-step, the stepping motor can perform accurate positioning directly on its own. However, if in the positioning process, the photoelectric encoder 4 detects that the stepping motor 21 is out-of-step, the out-of-step of the stepping motor 21 will be corrected depending on the photoelectric encoder 4 and the stepping motor is positioned to a correct position.

Figure 5:
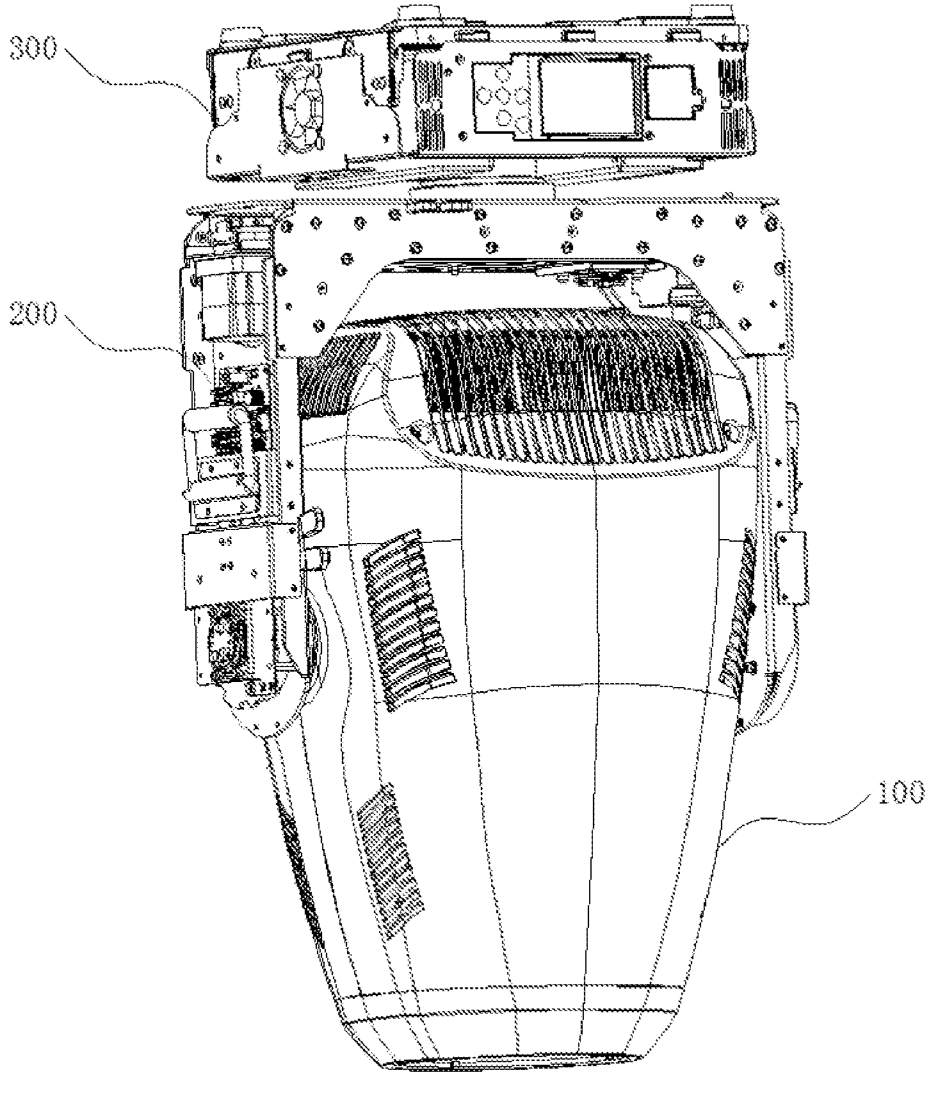
FIG. 5 is a schematic diagram of a light fixture according to the present invention.

The absolute encoder 1 can be an absolute magnetic encoder or an absolute inductive encoder. The absolute magnetic encoder determines the rotation angle according to the magnetic field direction, which has low price and high precision. While the absolute inductive encoder determines the rotation angle according to the change of magnetic field produced by electromagnetic induction, having better stability As shown in FIG. 5, a light fixture is provided, which applies the self-calibration method for positioning described above. The light fixture includes, a light head 100, a support arm 200 for supporting the light head 100 to rotate in a first dimension, and a case 300 for supporting the support arm 200 to rotate in a second dimension. A light source is arranged in the light head 100. At least one driving device is configured for driving the light head 100 and/or the support arm 200 to rotate. The absolute encoder (1) is specifically configured to detect a rotation angle of the light head (100) and/or the support arm (200).

In this embodiment, two driving devices and two absolute encoders are provided. A first driving device is connected to the light head 100 for driving the light head 100 to rotate, and a first absolute encoder is used for indicating the rotation angle of the light head 100. A second driving device is connected to the support arm 200 for driving the support arm 200 to rotate, and a second absolute encoder is used for indicating the rotation angle of the support arm 200.

In this embodiment, each driving device includes a stepping motor 21, a driving gear 22, a driven gear 23, and a belt 24. The driven gear 23 is provided with the absolute encoder 1. The stepping motor 21 is used for driving the driving gear 22 to rotate, and the driving gear 22 driving the driven gear 23 to rotate via the belt 24.

The driven gear 23 of the first driving device is connected to the light head 100. The driven gear 23 of the second driving device is connected to the support arm 200.

Obviously, the above-mentioned embodiments of the present invention are only examples for clearly illustrating the present invention, rather than limiting the implementation modes of the present invention. For those of ordinary skill in the art, changes or modifications in other different forms can also be made on the basis of the above description. It is not needed and it is impossible to list all implementation modes here. Any modifications, equivalent replacements and improvements made within the spirit and principles of the present invention shall be included within the protection scope of the claims of the present invention.

The invention claimed is:

1. A self-calibration method for positioning of a light fixture, wherein an absolute encoder for indicating a rotation angle of the light fixture, and a driving device for driving the light fixture to rotate are included, the self-calibration method comprises steps of:

S1) before shipment, setting a plurality of preset positioning reference points around a circumference of the absolute encoder, driving the light fixture to rotate by the driving device and acquiring a corresponding first output value of the absolute encoder at each preset positioning reference point;

S2) after shipment and before positioning the light fixture, driving the light fixture to rotate by the driving device, and acquiring a second output value of the absolute encoder, when the second output value is equal to the corresponding first output value at a certain preset positioning reference point, taking the preset positioning reference point as a calibrated positioning reference point, the calibrated positioning reference point being taken as an initial position for positioning; and S3) positioning the light fixture according to the calibrated positioning reference point.

2. The self-calibration method according to claim 1, wherein the plurality of preset positioning reference points are uniformly set around the circumference of the absolute encoder.

3. The self-calibration method according to claim 2, wherein thirty to forty preset positioning reference points are uniformly set around the circumference of the absolute encoder.

4. The self-calibration method according to claim 2, wherein the plurality of preset positioning reference points are uniformly set around the circumference of the absolute encoder at intervals of a degree between 5° and 15°, which is divisible by 360°, with an intersection of a vertical upward radial direction with the circumference as a starting point of 0°, rotation angles in counterclockwise direction of rotation being negative degrees, and rotation angles in clockwise direction of rotation being positive degrees.

5. The self-calibration method according to claim 1, wherein the driving device comprises a stepping motor for driving the light fixture to rotate.

6. The self-calibration method according to claim 5, wherein the driving device further comprises a driving gear, which is driven to rotate by the stepping motor; and a driven gear, which is driven to rotate by the driving gear, the absolute encoder being provided on the driven gear, and the driven gear being connected with the light fixture.

7. The self-calibration method according to claim 6, wherein the driving device further comprises a belt, and the driving gear and the driven gear are in transmission connection through the belt.

8. The self-calibration method according to claim 5, wherein a photoelectric encoder connected to the stepping motor is further comprised, which is used for detecting whether the stepping motor is overloaded to be out-of-step.

9. The self-calibration method according to claim 1, wherein the absolute encoder is in form of an absolute magnetic encoder or an absolute inductive encoder.

10. A light fixture adapted to carry out the self-calibration method according to claim 1, comprising a light head, a support arm for supporting the light head to rotate in a first dimension, and a case for supporting the support arm to rotate in a second dimension, wherein a light source is disposed in the light head, the driving device is configured for driving the light head and/or the support arm to rotate, and the absolute encoder is arranged on the driving device and configured to indicate a rotation angle of the light head and/or the support arm.

11. The light fixture according to claim 10, wherein the driving device comprises a stepping motor for driving the light fixture to rotate.

12. The light fixture according to claim 11, wherein the driving device further comprises a driving gear, which is driven to rotate by the stepping motor; and a driven gear, which is driven to rotate by the driving gear, the absolute encoder being provided on the driven gear, and the driven gear being connected with the light fixture.

13. The light fixture according to claim 12, wherein the driving device further comprises a belt, and the driving gear and the driven gear are in transmission connection through the belt.

14. The light fixture according to claim 10, wherein a photoelectric encoder connected to the stepping motor is further comprised, which is used for detecting whether the stepping motor is overloaded to be out-of-step.

15. The light fixture according to claim 10, wherein the absolute encoder is in form of an absolute magnetic encoder or an absolute inductive encoder.

16. The light fixture according to claim 10, wherein the plurality of preset positioning reference points are uniformly arranged around the circumference of the absolute encoder.

17. The light fixture according to claim 16, wherein thirty to forty preset positioning reference points are uniformly set around the circumference of the absolute encoder.

18. The light fixture according to claim 16, wherein the plurality of preset positioning reference points are uniformly set around the circumference of the absolute encoder at intervals of a degree between 5° and 15°, which is divisible by 360°, with an intersection of a vertical upward radial direction with the circumference as a starting point of 0°, rotation angles in counterclockwise direction of rotation being negative degrees, and rotation angles in clockwise direction of rotation being positive degrees.

* * * * *